J. S. BANTA & A. T. WEAVER.
AUTOMATIC MACHINE FOR REMOVING BURS FROM ELECTRIC WELDS.
APPLICATION FILED AUG. 23, 1912.
1,109,387.
Patented Sept. 1, 1914.
11 SHEETS—SHEET 3.
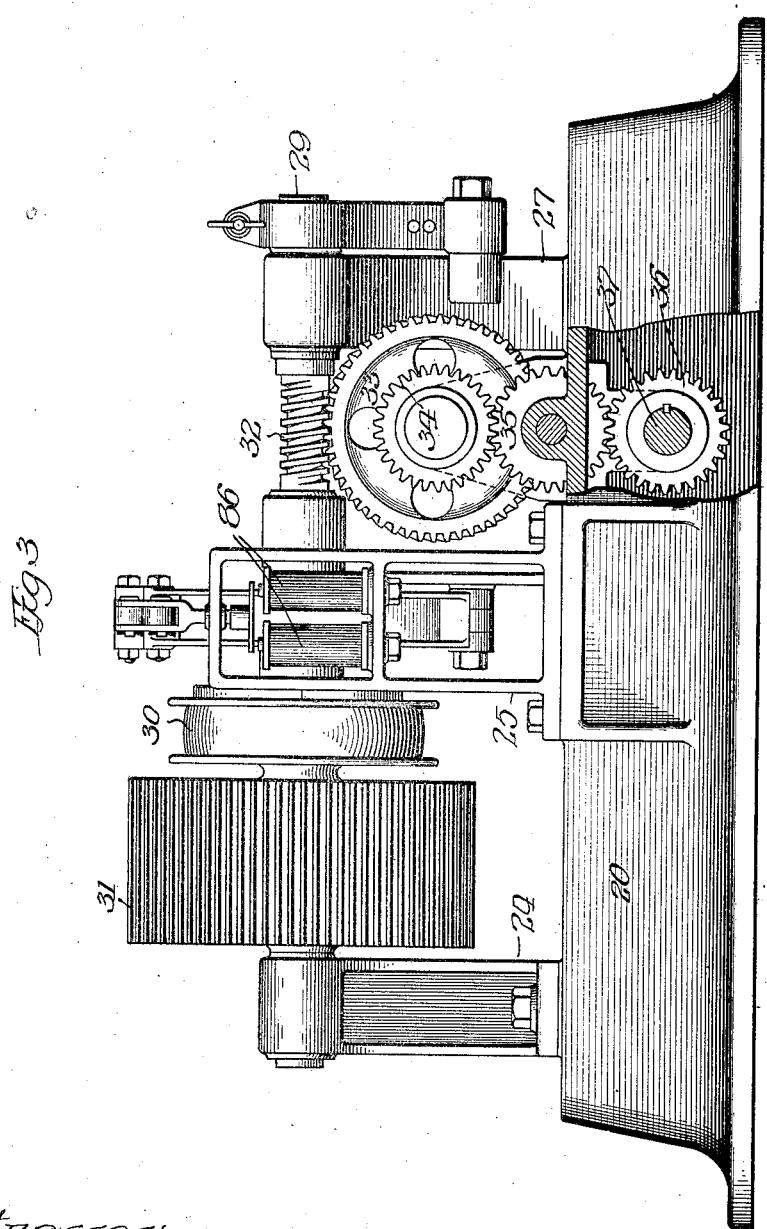

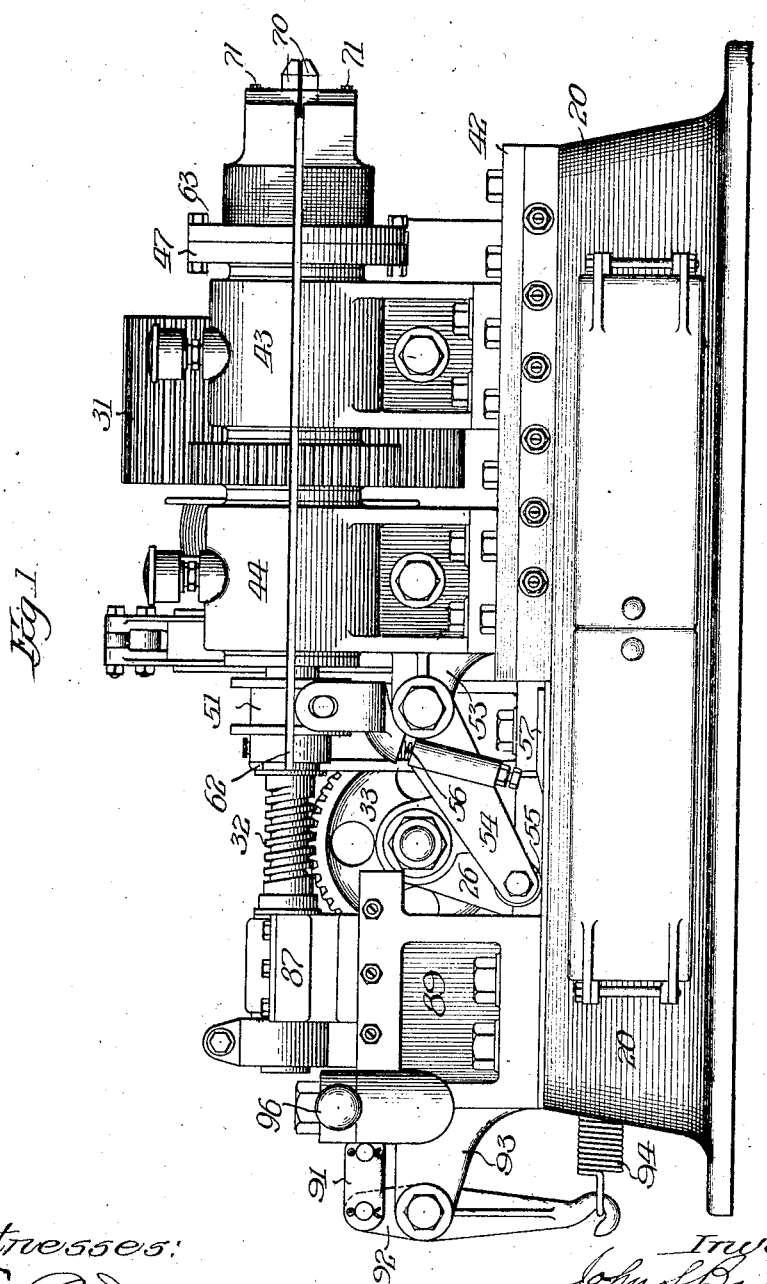

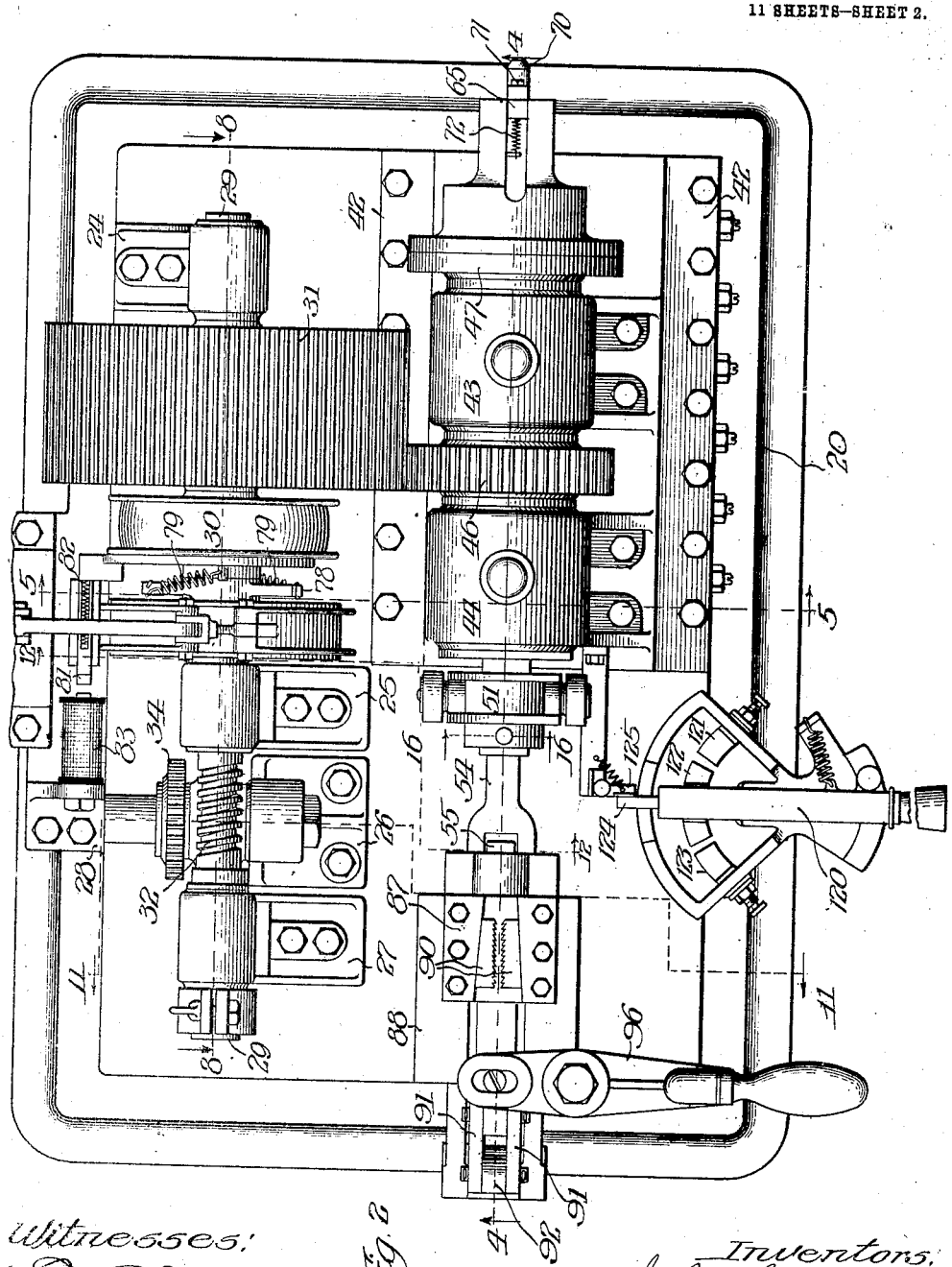

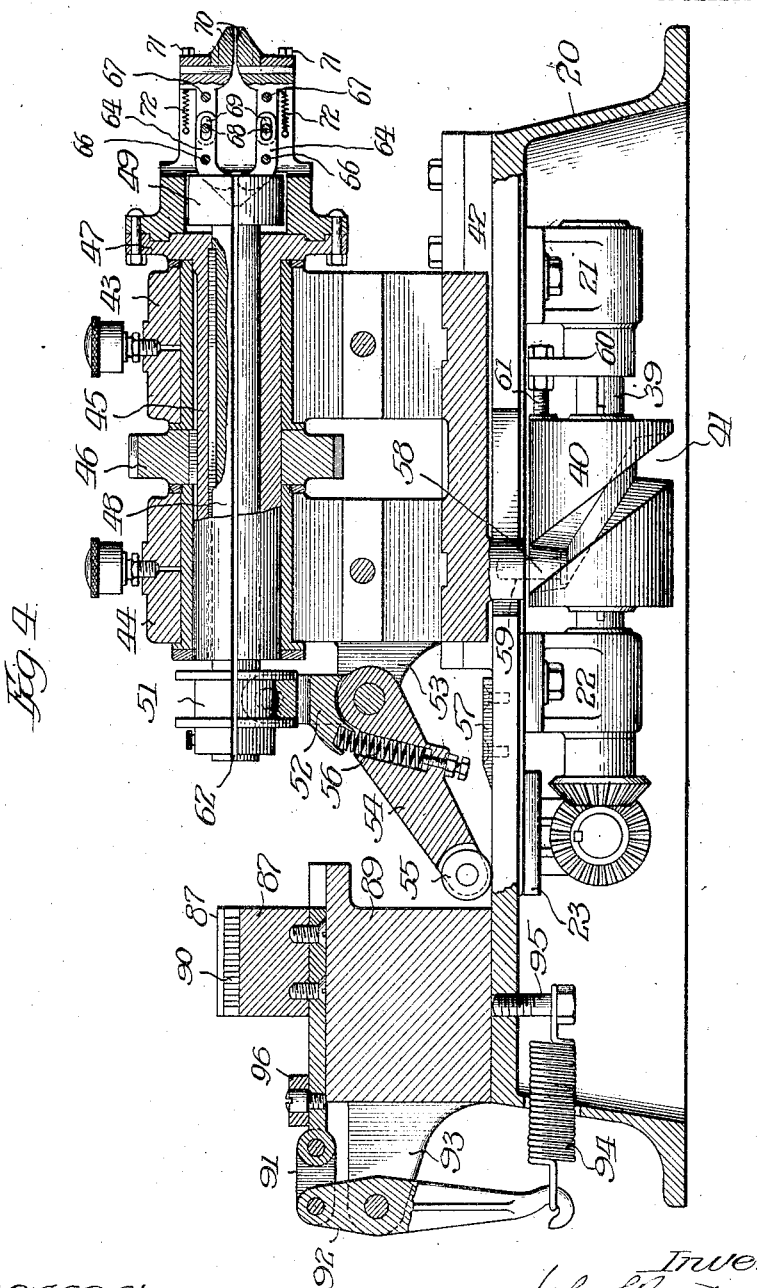

J. S. BANTA & A. T. WEAVER.
AUTOMATIC MACHINE FOR REMOVING BURS FROM ELECTRIC WELDS.
APPLICATION FILED AUG. 23, 1912.
1,109,387.
Patented Sept. 1, 1914.
11 SHEETS—SHEET 5.
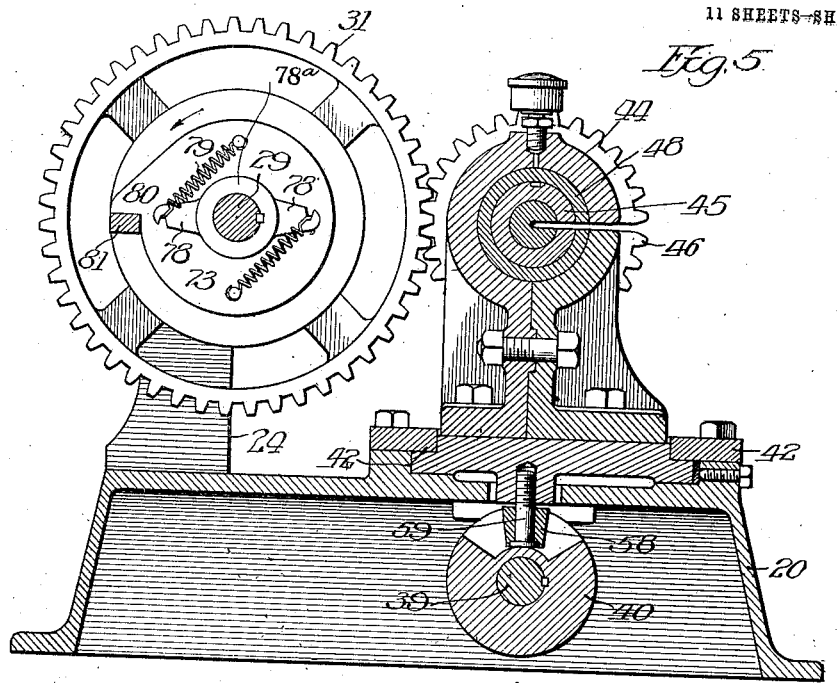
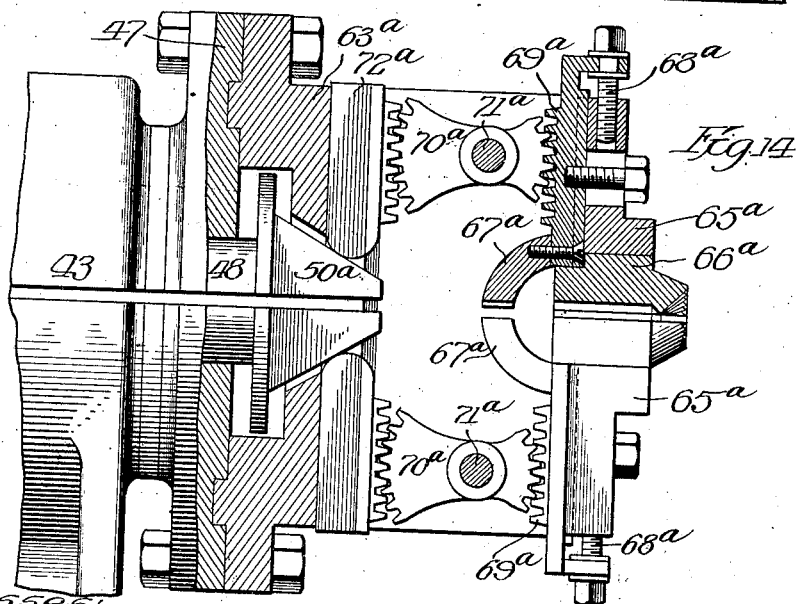

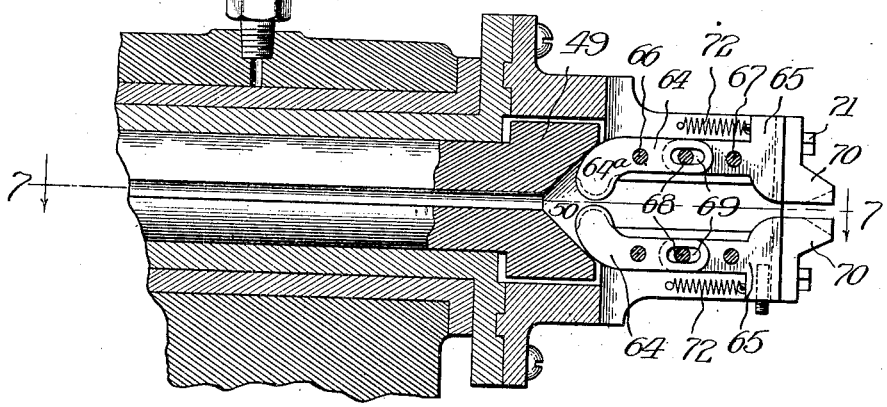
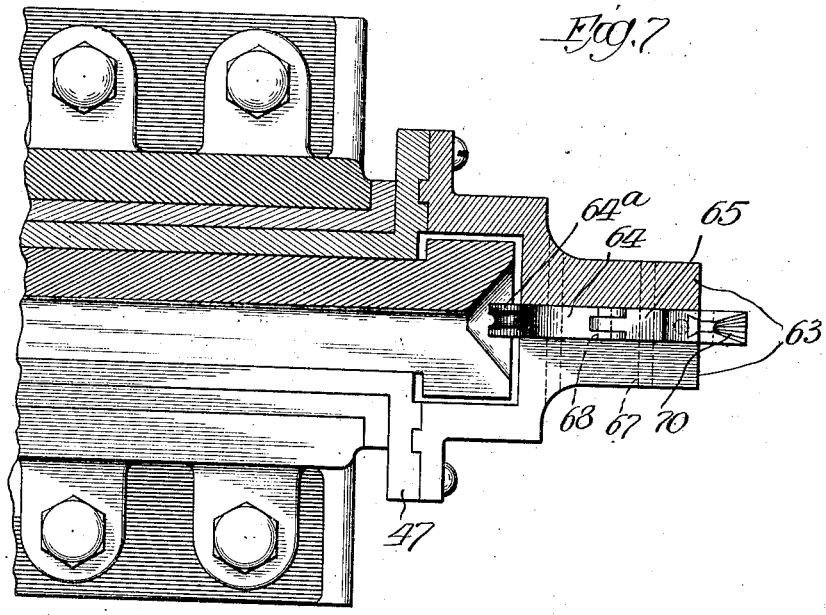

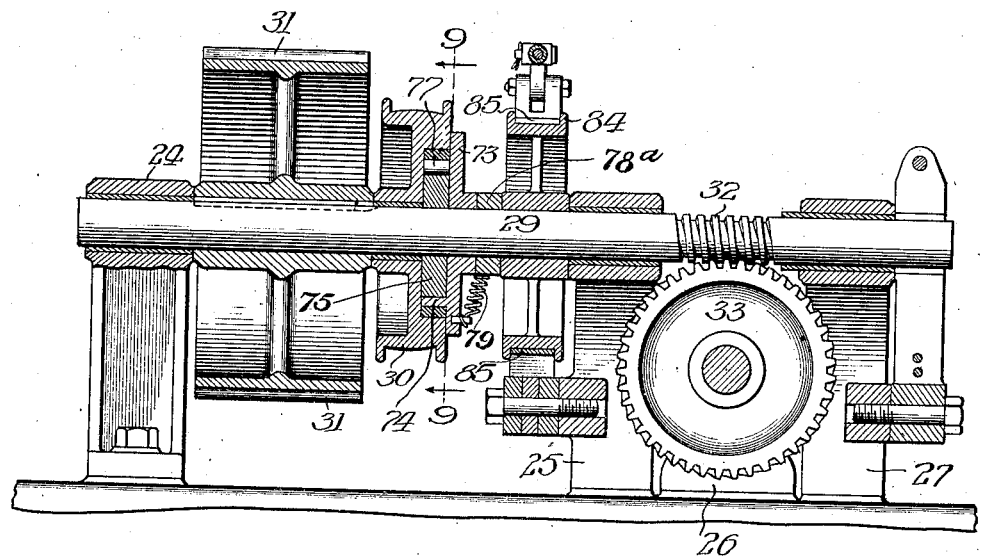
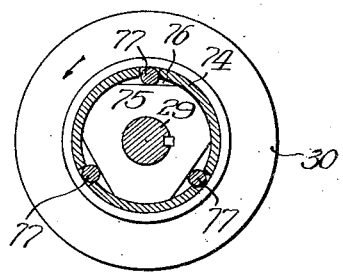
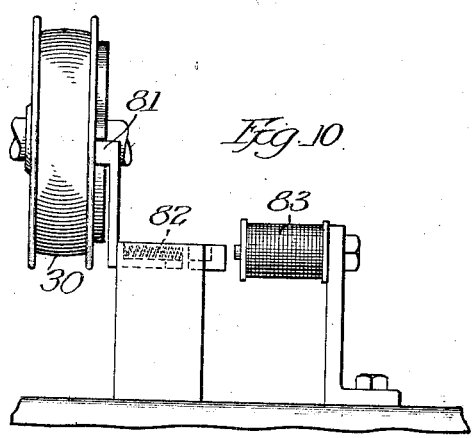

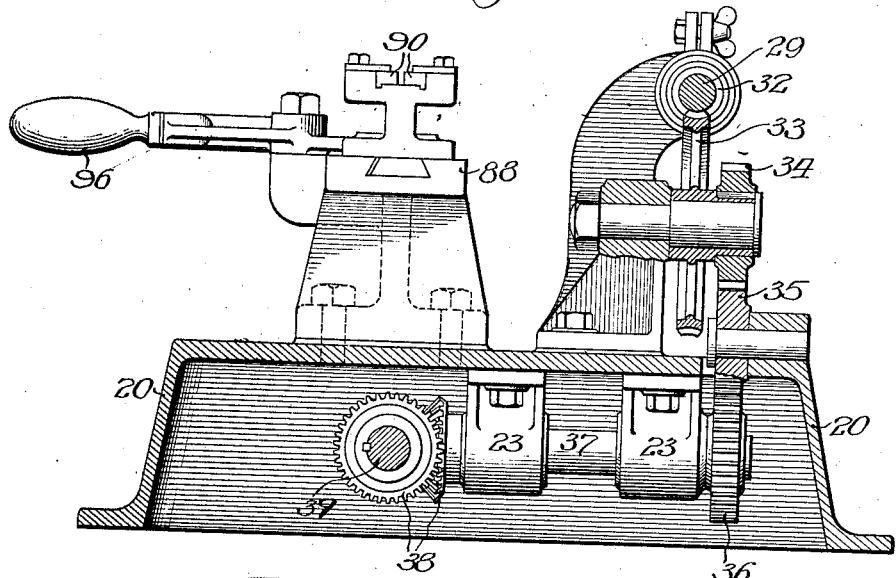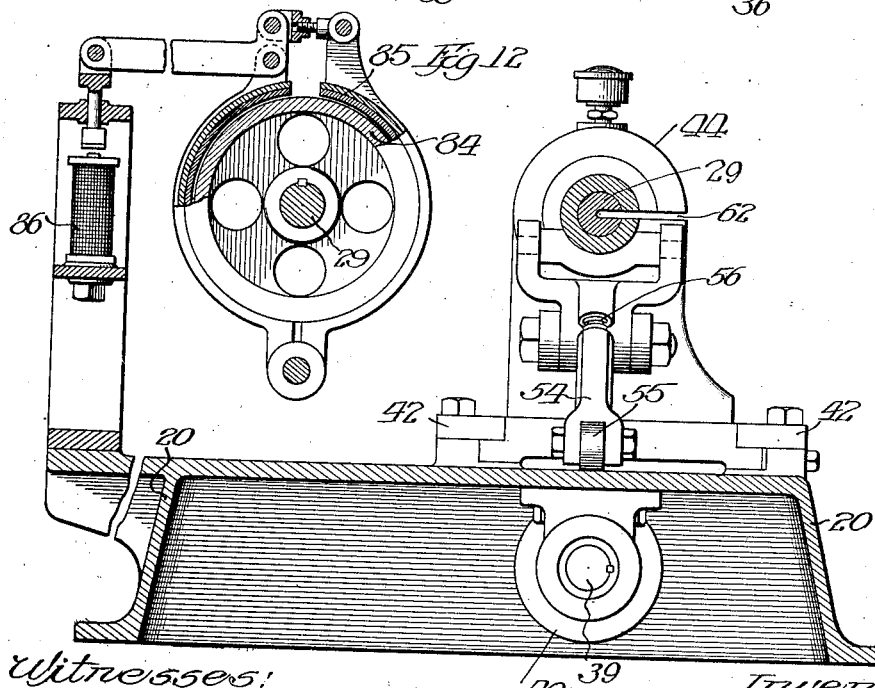

J. S. BANTA & A. T. WEAVER.
AUTOMATIC MACHINE FOR REMOVING BURS FROM ELECTRIC WELDS.
APPLICATION FILED AUG. 23, 1912.
1,109,387.
Patented Sept. 1, 1914.
11 SHEETS—SHEET 9.
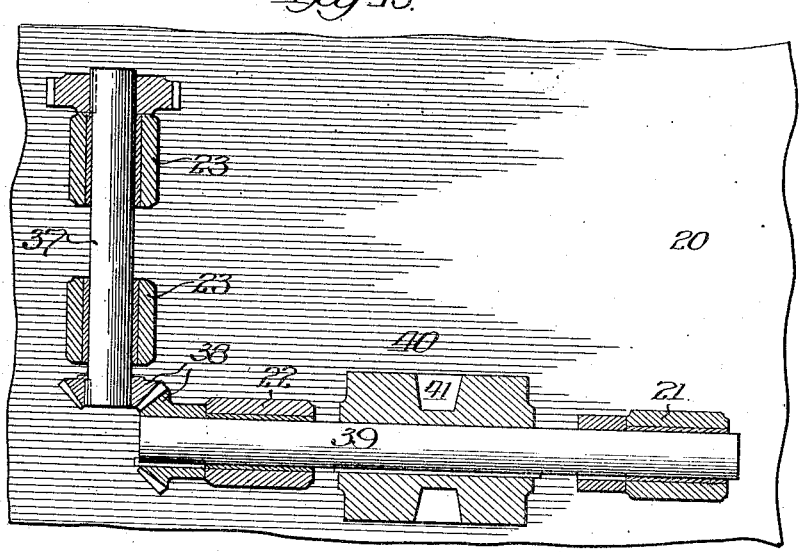
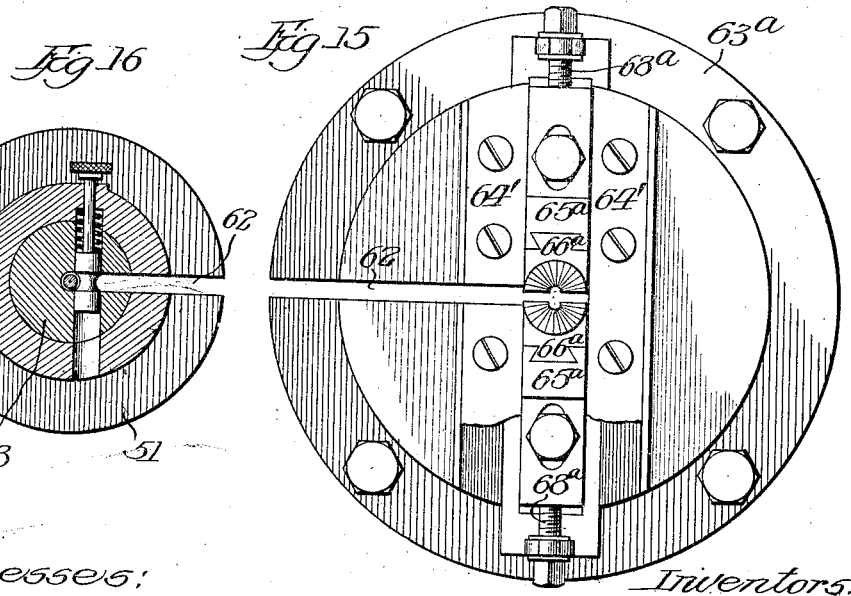

J. S. BANTA & A. T. WEAVER.
AUTOMATIC MACHINE FOR REMOVING BURS FROM ELECTRIC WELDS.
APPLICATION FILED AUG. 23, 1912.
1,109,387.
Patented Sept. 1, 1914.
11 SHEETS—SHEET 10.
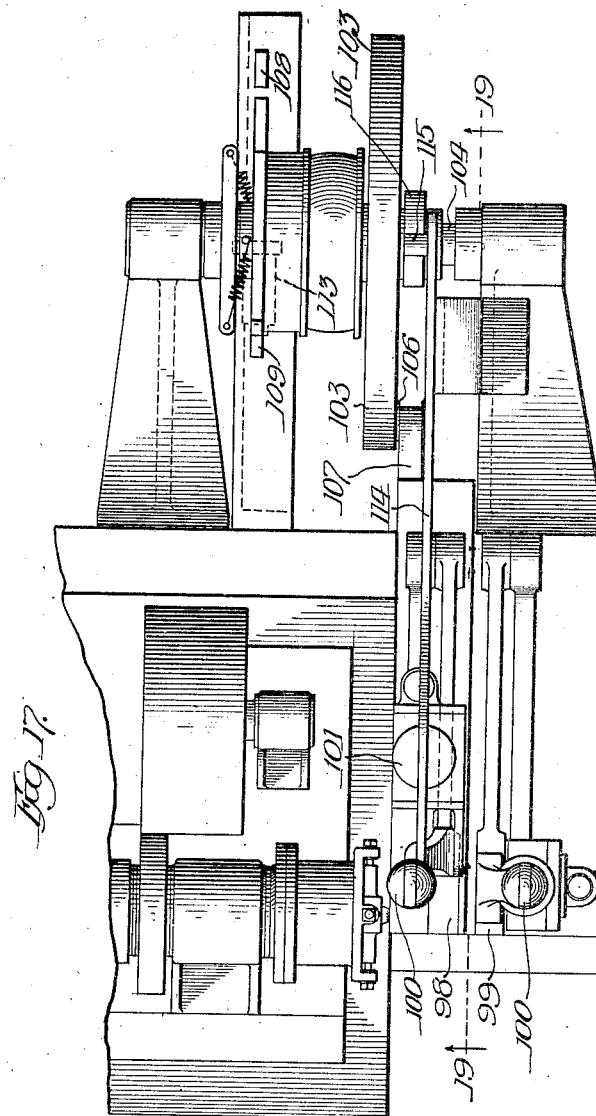
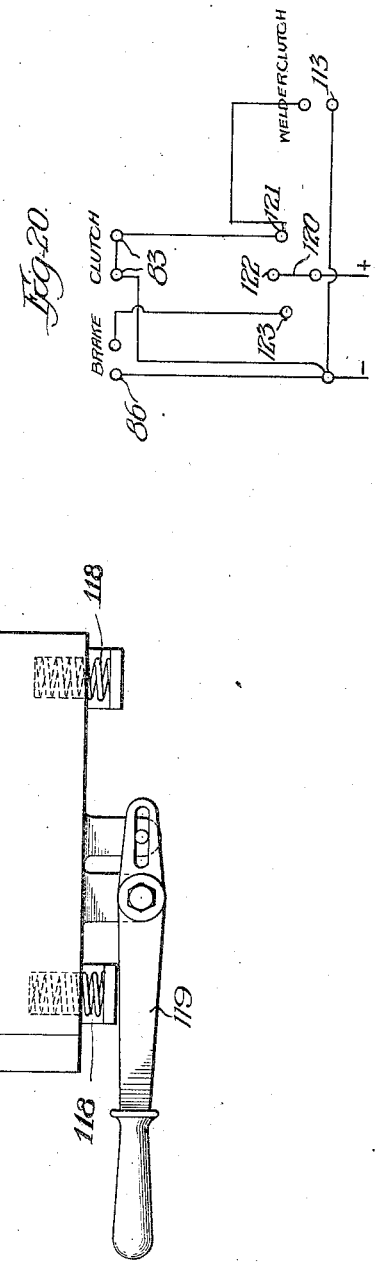

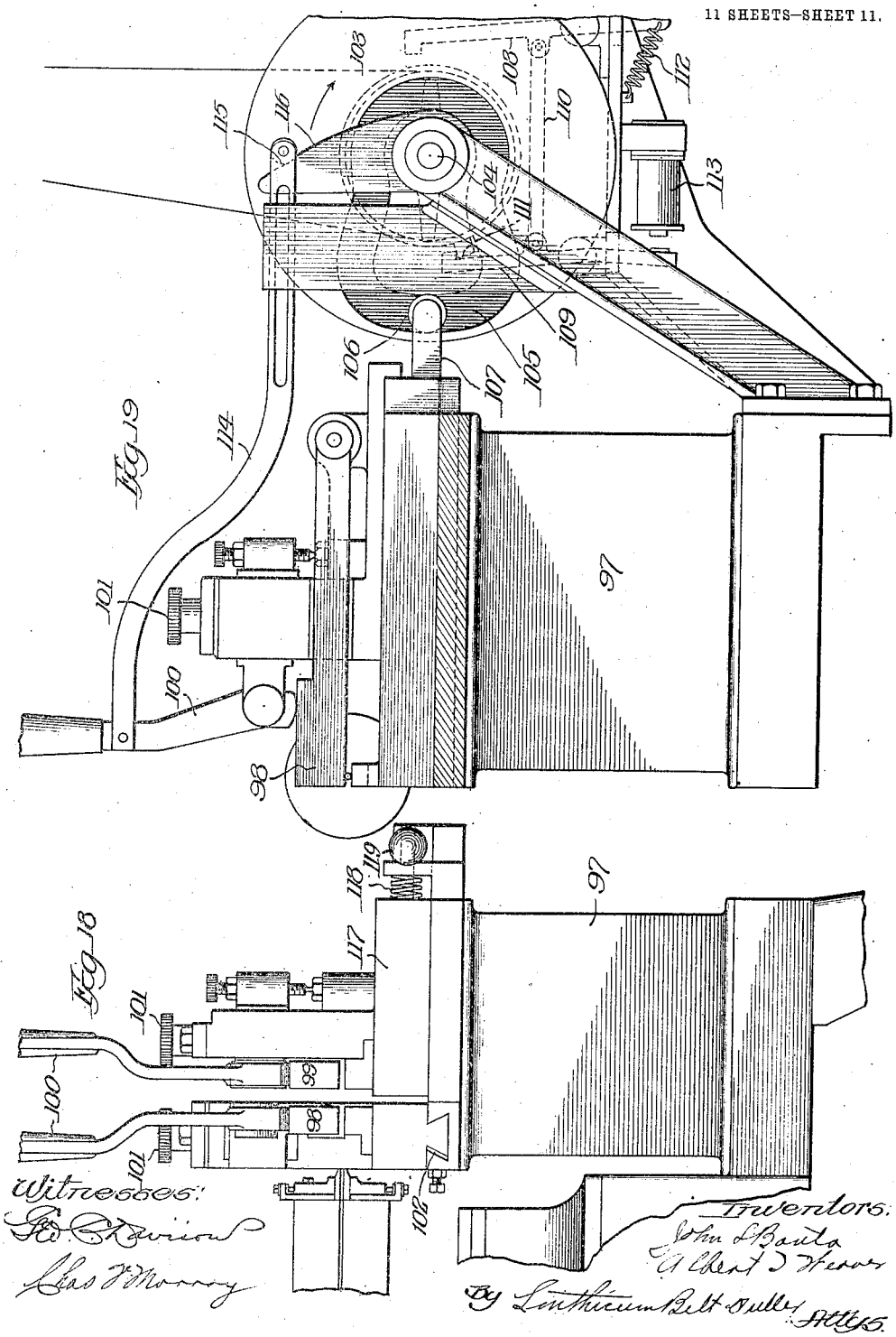

UNITED STATES PATENT OFFICE.

JOHN S. BANTA, OF WAUKEGAN, AND ALBERT T. WEAVER, OF JOLIET, ILLINOIS, ASSIGNORS TO THE AMERICAN STEEL & WIRE COMPANY OF NEW JERSEY, OF HOBOKEN, NEW JERSEY, A CORPORATION OF NEW JERSEY.

AUTOMATIC MACHINE FOR REMOVING BURS FROM ELECTRIC WELDS.

1,109,387.   Specification of Letters Patent.   Patented Sept. 1, 1914.

Application filed August 23, 1912. Serial No. 716,606.

*To all whom it may concern:*

Be it known that we, JOHN S. BANTA and ALBERT T. WEAVER, citizens of the United States, and residing at Waukegan, in the county of Lake, State of Illinois, and Joliet, in the county of Will, State of Illinois, respectively, have invented certain new and useful Improvements in Automatic Machines for Removing Burs from Electric Welds, of which the following is a specification.

Our invention relates to the art of electric welding and has particular reference to a novel automatic device for removing the burs from electrically welded articles.

The practice of joining metallic articles by electric welding is well established. In such practice it is common to clamp the two parts to be welded, then pass an electric current through the contacting ends, causing the metal to be fused. At the same time one of the clamping jaws is advanced toward the other thus upsetting and causing an intimate union of the metal at the contacting ends of the article; in effect, the two ends are caused to flow or fuse and be joined as one. However, an amount of metal equal in extent to the movement of the parts toward each other is displaced and flows outside of the original contour of the article, thus forming what is usually called a bur; that is, a surplus of metal of irregular shape, which metal must be removed by turning or grinding if the article is to have a regular surface.

In the illustrations we have shown the device as applied to the wire working industry. In many cases two ends of wire are united and the resultant bur must be removed by some means before the article can be further treated or used. This entails a large amount of labor and has heretofore precluded the employment of an electric welding device in connection with wire to be passed through the galvanizing process or for nail or fabric machines.

The herein described machine is adapted for use in connection with an electric welding machine of any well known type. A welding machine is shown in some of the figures of the drawings and our automatic bur removing machine is so arranged that the operations of the two units, that is, the welding and the bur removing devices, are sychronous, the weld is formed and immediately thereafter the bur removing device advances and properly shapes the article. During this operation the otherwise free end of the wire is held in one of the welding machine clamps.

The objects of our invention may be stated to be as follows: first, to provide a machine which shall be almost entirely automatic in character, thus eliminating skilled labor in its operation; second, to provide a machine which shall be capable of wide adjustment to accommodate different gages of wire; also to accommodate itself to inequalities such as may be present in the gage of the wire; third, to combine with such a machine a semi-automatic welding device, by means of which the ends of the article may be united, the resultant bur being thereafter removed.

Other and more particular objects will appear hereinafter and be specifically pointed out in the claims.

Our invention will be more readily understood by reference to the accompanying drawings, wherein, Figure 1 is a side elevation of a machine constructed in accordance with our invention; Fig. 2 is a plan view of the same; Fig. 3 is an elevation taken from the opposite side to that shown in Fig. 1; Fig. 4 is a transverse vertical section on the line 4—4 of Fig. 2; Fig. 5 is a transverse section on the line 5—5 of Fig. 2; Fig. 6 is an enlarged, partly sectional elevation of the gaging and cutting mechanism; Fig. 7 is a section on the line 7—7 of Fig. 6; Fig. 8 is a section on the line 8—8 of Fig. 2; Fig. 9 is a section on the line 9—9 of Fig. 8; Fig. 10 is a detail elevation showing means for operating the clutch; Fig. 11 is a section on the line 11—11 of Fig. 2; Fig. 12 is a section on the line 12—12 of Fig. 2; Fig. 13 is a view from beneath showing the gearing for operating various parts; Fig. 14 is an enlarged sectional elevation of a modified form of cutter head; Fig. 15 is an end elevation of the same; Fig. 16 is a section considerably enlarged on the line 16—16 of Fig. 2; Fig. 17 is a plan view of a welding machine adapted for coöperation with our bur removing machine; Fig. 18 is a front elevation of the same; Fig. 19 is a section on the line 19—19 of Fig. 17, and Fig. 20 is a diagram of the wiring circuits controlling the different electrically operated elements of the machine.

Referring more particularly to the drawings, it will be seen that the machine is superposed on a base 20, having downwardly projecting bearing brackets 21, 22 and 23, as shown in Fig. 4, and upwardly projecting brackets 24, 25, 26, 27 and 28. Within the bearings 24 to 27 inclusive is mounted a main drive shaft 29, power being supplied to such shaft by a belt pulley 30. A large gear 31 is keyed to the main shaft 29, and a worm 32 also forms a part of the shaft and transmits motion to a train of gearing, best shown in Fig. 3, in which there are gears 33, 34, 35 and 36. The latter gear is keyed to a short shaft 37, mounted on bearings 23, as shown in Figs. 3 and 13, which shaft by means of beveled pinions 38, transmits motion to cam shaft 39, mounted on bearings 21 and 22, having an element 40, provided with an endless cam groove 41 therein. This is shown to advantage in Fig. 4.

Mounted in ways 42 on the base 20 and adapted to be guided thereby is a bodily movable turret composed of bearings 43, 44, and carrying therein a hollow shaft 45. Referring to Fig. 4, it will be seen that to this shaft is pinned a toothed gear wheel 46, meshing with the large gear 31 on the main drive shaft. The hollow shaft 45 is provided with an annular flange 47, to which is secured the gage operating devices later to be described. Within the hollow shaft 45 is a second shaft 48, having an annular enlargement 49, recessed to provide a wedge element, adapted to coöperate with the clamping or engaging devices later to be described. The shaft 48 is splined to shaft 45, in order to permit of its longitudinal movement with regard thereto. This shaft is provided on its opposite end with a grooved collar 51, adapted to accommodate a yoke 52, pivoted on a bracket 53, forming a part of bearing 44. Coöperating with the yoke member 52, is a lever 54, also pivoted to bracket 53, and carrying an anti-friction roller 55 on its free end. The lever 54 actuates the yoke 52 through a coiled spring 56, so arranged that the force exerted by the lever on the yoke is not positive. This is desirable as will be understood from the later description because of possible inequalities of the material to be acted upon. The lever 54 is actuated by reason of the anti-friction roller 55, riding up on a cam 57, secured to the frame 20. As heretofore stated, the turret is bodily moved in the ways 42. This movement is caused by the cam element 40, coöperating with an anti-friction roll 58, mounted on a pin 59, projected from the bottom of the bearing members 43, 44. Thus it will be seen that the movement of the turret corresponds to the length of the cam groove. In order to provide for fine adjustment of movement of the turret, the cam member 40 is splined on the shaft 39. A bracket 60 is fixed to the same shaft and a bolt 61 is threaded through the bracket and into the cam element 40, thereby providing for longitudinal adjustment of the cam and consequent control of the travel of the turret. It will be seen that the hollow shaft 45, the interior of shaft 48, the collar 51 and the flanges 47, 49, as well as the bearing members 43, 44, are all slotted, the slot 62 providing for the entrance of a wire to be acted upon.

The gaging and cutting mechanism, as best shown in Figs. 4, 6 and 7, is carried in a frame 63 having a bifurcated end, which is bolted to the flange 47 of the shaft 45. This member is likewise slotted as heretofore described. Between the extensions of the frame 63 are mounted levers 64—64 and 65—65. The levers 64 rotate on pins 66 and the levers 65 rotate on pins 67. The levers 65 are provided with short studs 68 normally registering with slots in the levers 64. The inner ends of the levers 64 are inturned to provide a surface for coöperation with the concavity 50 in the shaft 48. The interned ends 64ª are grooved to accommodate the wire to be acted upon and thus act as a gage, the motion transmitted to the levers 65 and the attached cutting devices being limited by the movement of the inturned ends 64ª. Cutting tools 70 are secured to the enlarged outer ends of the levers 65 and are mounted for adjustment by means of suitable cap bolts 71. Springs 72 normally maintain the cutting tools and associated levers in retracted position. However, it will be seen that as the shaft 48 is moved longitudinally toward the cutting end, the inturned ends 64ª will be brought together. This motion will be transferred to the tools 70, closing the same upon the work to the extent permitted by the gage. A modification of this construction is shown in Figs. 14 and 15. In this construction we provide a very similar frame member 63ª. Ways 64′, on the outer end of the frame accommodate vertically movable jaws 65ª, having a cutting tool 66ª dove-tailed therein. This tool is in two halves and the jaws 65ª are adapted to be moved toward and from each other to provide an opening registering with the slot 62, to permit the entrance of the wire to be acted upon. Secured to the jaws 65ª are gages 67ª, projecting inwardly from the cutting tool. These are adapted to grip the wire and control the bite of the cutting tool on the wire. The jaws 65ª are adjustable by means of set bolts 68ª, with relation to racks 69ª. These racks are actuated by means of segmental gears 70ª, pivoted at 71ª, to part of the frame 63ª. Racks 72ª, slidably mounted in ways in the frame 63ª, actuate the gears 70ª. The racks 72ª are actuated by means of wedge-shaped nose pieces 50ª, on the shaft 48. It will be seen that as the turret advances carrying the lever 54, said lever will ride up the cam 57 and by spring pressure move the shaft 48 longitudinally, thus forcing the nose pieces against the racks 72ª, pressing them outwardly. This rotates the segmental gears 70ª, and shifts the jaws 65ª, carrying the cutting tools 66ª inwardly. As the turret is moved backward, the lever riding down the cam will retract the shaft and release the tool from the wire.

The clutch heretofore referred to and shown in Figs. 8 to 10 inclusive, may be of any preferred type. However, we prefer the one shown herein which includes a member 73, loosely mounted on the shaft 29 and carrying integral inwardly projecting segmental portions 74. A disk 75 is keyed to shaft 29 and has a plurality of flattened surfaces 76. Rollers 77 are interposed between the contiguous edges of the segmental portion 74 and accommodated in the flattened parts of the disk 75. A collar 78ª having oppositely projecting arms 78 best shown in Fig. 5, is keyed to shaft 29, the arms having hooks on their ends, on which are fastened the ends of coiled springs 79, the other ends of which are secured to the part 73, loosely mounted on the shaft 29. The part 73, as shown in Fig. 5, has a shoulder 80 on its periphery, this shoulder being adapted to coöperate with a stop 81, actuated against the force of spring 82 by a magnet 83. The tendency of the coiled springs is to contract, thus advancing the part 73 with its inwardly projecting segmental portions 74 and rollers 77, in the direction of the arrow in Figs. 5 and 9. The pulley 30 is also adapted to run in the direction of the arrow and when the rollers 77 are released they will be wedged between the contacting surfaces and transmit motion to the shaft 29. When it is desired to break the connection the stop 81 is projected under the shoulder 80 and the rollers are dislodged. This is an old and well known form of clutch and no claims are herein made thereon.

It will be seen that there are a number of parts, each having slots which must register in order to insure the insertion or removal of the wire. Therefore it is necessary that all of these slots should register when the mechanism is stopped. To insure such action we provide a brake member, as best shown in Figs. 3, 8 and 12, comprising a pulley 84, keyed to shaft 29 and having a brake-band 85, coöperating therewith. Force is applied as required to the brake-band by means of magnets 86. The circuit through which the various magnets in the system are controlled is shown in Fig. 20 and will be later described.

During the cutting operation it is desirable that the wire should be held taut and. we have provided a suitable device therefor. This comprises a reciprocating head 87, mounted in ways 88, superposed on a bracket or standard 89. On the head are clamping jaws 90, mounted in ways which converge toward the forward end. The jaws are toothed and it will be seen that a wire held by said jaws will be clamped against a pulling force in the line of action. The reciprocating head is connected by a link 91, to one end of a lever 92, pivoted on a bracket 93. A coiled spring 94 is connected to the free end of the lever 92, the spring being attached by means of a suitable bolt 95, to a part of the base 20. Thus it will be seen that the head is normally held in retracted position. However, when a wire is inserted or secured in the jaws, the head is manually shifted toward the right, as shown in Fig. 2, by means of a hand lever 96. The wire is then held against the tension of the spring 94 until released at its forward point of engagement.

A welding machine which is semi-automatic in character, is shown in Figs. 17, 18 and 19, and arranged for coöperation with the bur removing device. The welder is mounted on an extension 97, on the frame 20, and comprises in addition to the base, two pairs of clamping jaws 98, 99. The clamps are alike provided with cam operated clamping levers 100, and with motion limiting screws 101. The head 98 is mounted for reciprocation transversely of the path of the wire in a dove tailed groove 102, the reciprocation being caused automatically by means of a cam disk 103, mounted on a shaft 104, connected to a suitable source of power. This cam disk is provided with a cam groove 105, within which an anti-friction roll 106 is seated. This roll is attached to an extension 107 of the head 98. It will be seen that a complete revolution of the disk 103 will cause a complete forward and backward movement of the head 98. It is desirable, however, that this movement should be governed in accordance with the action of the bur removing device; that is, that it should be retracted as soon as the weld is formed to permit the instant advance of the cutting head heretofore described and returned to its operative position as soon as the head has been retracted after having completed its work. We have therefore provided a clutch device which is electrically operated and best shown in Fig. 19. In this figure it will be seen that we provide two pivoted stop members 108, 109, connected by means of the link 110. The hooks on the ends of these members are adapted to alternately engage with a stop 111 on the disk 103. These stop members 108, 109, are held in one position by means of a coiled spring 112, and shifted against the force of the spring by means of a magnet 113. This magnet is on the same circuit as the clutch operating magnet heretofore described.

In Fig. 19 the magnet 113 has been deenergized, which has disengaged the stop 111 from the hook on the end of the lever 108, permitting the turning of the disk until stopped by the hook on the end lever 109, thus advancing the clamping member 98. The handle 100, which operates to clamp the part 98, is arranged for manual operation to clamp the wire but for automatic disengagement therefrom. This is accomplished by the link 114, connected to the handle 100, and carrying an anti-friction roll 115 on its end. This roll is contacted by a cam 116, operating in unison with the disk 103. It will be seen that as the disk rotates in the direction of the arrow, the cam contacting the part 115, will tend to shift the lever 100 and free the clamp 98. This occurs just prior to the withdrawing of the clamp 98 from its normally operative position. The clamp 99 is controlled manually both as to its opening and closing movements. The head carrying the clamp 99 is movable on its base 117, in a direction transverse to that of the head 98. This base is mounted on suitable ways and is held in advanced position by means of coiled springs 118. The head and its base are retracted against the force of the springs by a hand lever 119. It will be understood that the two ends of the wire to be operated upon are placed in contact, with the head 99 retracted somewhat by means of the handle 119. As soon as the wire is clamped and current applied, the handle is released and as the metal is fused it is upset or caused to flow by the shifting of the head, due to the force of the coiled springs 118. This causes the welding or fusing together of the ends of the wire. The clamp 99 performs another useful function in holding one end of the wire during the operation of the cutting head. It will be seen that some holding means is necessary to prevent the twisting of the wire during the operation of removing the bur.

The means for starting and stopping the different instrumentalities is controlled by a hand lever 120, as best shown in Fig. 2. The circuits controlled by this lever are shown diagrammatically in Fig. 20. There are three contact points 121, 122 and 123. The first mentioned makes a positive connection to the magnets 83 and 113, controlling, respectively, the starting clutch and the welder clutch. When this action takes place the machine is started in operation and simultaneously therewith the welding jaw 98 is retracted by a half revolution of the cam 103. As a safety feature and to prevent the accidental starting of the machine we provide the lever 120 with a spring-controlled stem 124, which is contacted by a swinging stop 125, mounted on a part of the bearing 44 and movable therewith. To move the lever 120 onto the contact 121, the stem 124 is retracted to free it from the stop 125. This starting into action causes the forward travel of the turret member, the stop 125 swinging past the stem 124. The return movement of the turret disconnects the switch from the contact 121 and throws the lever past the contact point 122, onto the point 123. This point connects a circuit through the brake magnets 86. Thus instantly the brake is applied bringing the machine to a standstill. The breaking of the electrical connection to the welder magnet 113 releases the lug 111 from the stop 108 and permits a half revolution of the cam 103. This advances the clamping jaw 98 into position ready for another weld. Assuming the parts of the bur-removing device in the position of Fig. 1, and with the wire to be welded located within the slot 62, the free end of the wire being held by the clamp 98, as shown in Fig. 18. A wire to be joined thereto is clamped by the jaws 99, with the ends of the wire abutting. Prior to clamping the wire by the jaws 99, these jaws are retracted against the energy of the spring 118, by means of the handle 119. Electric current is then supplied and as the ends of the wire are fused the spring 118 forces the jaws 99 inwardly thus upsetting the end of the wire. After the completion of the welding operation the wire is released from the jaws 98 and said jaws retracted out of the plane of the wire. The bur-removing mechanism is then started into operation, the head, carrying the bur-removing tool 70 being advanced by the cam 40, shown in Fig. 4. As the head advances the arm 54, shown in that figure, rides up the incline 57 causing a shifting of the shaft 48 relative to the head. This movement causes the contraction of the segmental tool 70 thus bringing it into contact with the bur on the wire. This tool being rotated at a high speed, cuts off the bur. The head is then retracted by the cam 40, the halves of the tool are separated by the lever 54 riding down the incline 57, and, by the brake mechanism, the machine is stopped with the slot 62 presenting outwardly in such manner as to permit the removal of the wire. The clamps 99 are then released and the joined wire may be removed.

The instrumentalities herein described are only typical and many modifications may be made therein, all without departing from the spirit of our invention as set forth in the appended claims.

We claim:

1. In a bur-removing device, the combination of a base, a movable head, means for automatically moving said head forward and backward through its path of travel during each cycle of operation, a cutting tool bodily rotatably mounted in said head, and means for bringing said tool into contact with the work during the forward travel of said head and retracting the same therefrom during the backward travel of the head, substantially as described.

2. In a device of the class described, the combination of a base, a movable head, means for moving said head, a cutting tool associated with said head and rotatable relative thereto, means for bringing said tool into contact with the work and permitting the retraction of the same therefrom, and a spring interposed in the means for bringing said tool into contact with the work and arranged whereby the contact of the tool with the work is non-positive, substantially as described.

3. In a bur removing machine, the combination of a base having ways, a head adapted to act upon a section of welded material, said head being mounted for reciprocation in said ways, means causing reciprocation of said head, said means including a cam, and means for bodily shifting said cam whereby the path of travel of said head is changed, substantially as described.

4. In a device of the class described, the combination of a base, a head mounted for movement relative to said base, a hollow shaft carried by said head, a cutting tool carried by said shaft, means for rotating said shaft and tool, means permitting the location of the work in the center of said shaft, and means for bringing said tool into contact with the work during the travel of said head, substantially as described.

5. In a device of the class described, the combination of a base, a head movable relative thereto, a hollow shaft carried by said head, a cutting tool carried by said hollow shaft, means for rotating said tool and shaft, a second shaft within said hollow shaft and arranged for rotation therewith and longitudinal movement relative thereto, and means connecting said second shaft with said cutting tool whereby said tool is brought into contact with the work during the travel of said head, substantially as described 6. In a device of the class described, the combination of a base, a head movable relative thereto, a hollow shaft in said head, a cutting tool carried by said shaft, a second shaft within said first shaft, said second shaft being arranged to actuate said cutting tool, means for causing relative longitudinal movement of said second shaft, said means including an arm traveling with said head, and a spring associated with said arm whereby the actuation of said second shaft is non-positive, substantially as described.

7. In a device of the class described, the combination of a base, a head mounted for movement relative thereto, a hollow shaft mounted in said head, a cutting tool carried by said shaft, a second shaft within said hollow shaft, said second shaft being adapted for longitudinal movement relative to said hollow shaft whereby to cause the actuation of said cutting tool, said head, hollow shaft and longitudinally movable shaft being grooved longitudinally to permit the insertion from the side, of the work to be acted upon, substantially as described.

8. In a device of the class described, the combination of a base, a head movable relative to said base, means in said base adapted to move said head in a defined path, means for adjusting said head-moving means whereby to regulate the stroke of said head, a bur removing tool associated with said head, and means for bodily rotating said tool and simultaneously bringing the tool into contact with the work, substantially as described.

9. A bur removing device, comprising in combination, a divided cutting tool, means for advancing and retracting said divided tool, and gage members movable with the sections of the tool and adapted to limit the bite of said tool, substantially as described.

JOHN S. BANTA.
    ALBERT T. WEAVER.

Witnesses to signature of John S. Banta:
 GEO. SELLS,
 WM. W. WARD.

Witnesses to signature of Albert T. Weaver:
 JAMES E. SIME,
 CHAS. H. SCHELTER.